US007983461B2

(12) United States Patent
Lee et al.

(10) Patent No.: US 7,983,461 B2
(45) Date of Patent: Jul. 19, 2011

(54) METHOD AND SYSTEM FOR EXTRACTING DISTAL RADIUS METAPHYSIS

(75) Inventors: Sooyeol Lee, Daejeon (KR); Jeong Won Lee, Daejeon (KR); Seunghwan Kim, Daejeon (KR); Seon Hee Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 622 days.

(21) Appl. No.: 12/111,320

(22) Filed: Apr. 29, 2008

(65) Prior Publication Data
US 2009/0148022 A1 Jun. 11, 2009

(30) Foreign Application Priority Data

Dec. 10, 2007 (KR) ........................ 10-2007-0127883

(51) Int. Cl.
*G06K 9/00* (2006.01)
(52) U.S. Cl. .......... 382/128; 250/370.08; 378/1; 378/62
(58) Field of Classification Search .......... 382/128–132, 382/199, 205; 250/370.08, 370.09, 390.06; 378/1–28, 62–63
See application file for complete search history.

(56) References Cited

U.S. PATENT DOCUMENTS

| 4,784,124 | A | * | 11/1988 | Kaltenbrunner et al. ........ 606/63 |
| 4,903,203 | A | * | 2/1990 | Yamashita et al. ............ 382/132 |
| 5,915,036 | A | * | 6/1999 | Grunkin et al. ............... 382/132 |
| 5,931,780 | A | * | 8/1999 | Giger et al. .................... 600/407 |
| 6,411,729 | B1 | * | 6/2002 | Grunkin ......................... 382/132 |
| 7,848,893 | B2 | * | 12/2010 | Thodberg ......................... 702/19 |
| 2003/0053673 | A1 | * | 3/2003 | Dewaele ....................... 382/132 |
| 2003/0065264 | A1 | | 4/2003 | Tsoref et al. |
| 2004/0114789 | A1 | * | 6/2004 | Saha et al. .................... 382/128 |
| 2008/0139912 | A1 | | 6/2008 | Lee et al. |

FOREIGN PATENT DOCUMENTS

| EP | 0 626 656 A2 | 11/1994 |
| JP | 7-168944 A | 7/1995 |
| KR | 1020050053488 | 6/2005 |
| KR | 1020060008849 A | 1/2006 |
| KR | 1020070077319 A | 7/2007 |
| KR | 1020080052090 A | 6/2008 |

* cited by examiner

*Primary Examiner* — Manav Seth
(74) *Attorney, Agent, or Firm* — Ladas & Parry LLP

(57) ABSTRACT

Provided is a method and an apparatus for extracting an edge of a distal radius metaphysis. The method includes: setting a region of interest including a distal radius in an X-ray image; setting a potential energy distribution of the region of interest by using a gradient of gray levels; setting a temporary edge adjacent to both sides of a distal radius metaphysis and a side of an epiphysis in the region of interest; and extracting a detailed edge of the distal radius metaphysis having minimum energy by adjusting the set temporary edge using a metropolis annealing technique.

10 Claims, 9 Drawing Sheets

METHOD AND SYSTEM FOR EXTRACTING DISTAL RADIUS METAPHYSIS

CROSS-REFERENCE TO RELATED APPLICATIONS

This application claims the priority of Korean Patent Application No. 10-2007-0127883 filed on Dec. 10, 2007, in the Korean Intellectual Property Office, the disclosure of which is incorporated herein by reference.

BACKGROUND OF THE INVENTION

1. Field of the Invention

The present invention relates to a method and system for extracting an edge of a distal radius used to predict an adult height of a child from an X-ray image.

2. Description of the Related Art

Recently, as concerns about children's growth increase, the development of a clinical method of predicting an adult height of a child and a treatment of increasing the adult height becomes main interests of children growth researches.

Particularly, the prediction of child's adult height is performed on the basis of bone age measurement of the child. Here, a bone age means the degree of physiological maturation of a child's bones that is different from a physical age of the child. Therefore, the bone age is not equal to the physical age, and the bone ages of persons in a state where bone maturation is finished are equal.

Therefore, the bone age is used as the degree of a child's growth remaining time. When the bone age is advanced than the physical age, a growth remaining time is short, and it is determined that the remaining growth of a child is short. Therefore, for a child of whose adult height is predicted to be short by the bone age measurement, growth treatment is needed to increase the adult height before the bone maturation is finished.

As representative methods for measuring bone age, there are a Greulich-Pyle (GP) method based on atlas and a Tanner-Whitehouse (TW) method of describing the degree of bone maturation as a score. Particularly, the TW is more objective and so widely applied. The TW method is improved as a TW2 method, and in 2000, a TW3 method is introduced.

In the TW3 method, by adding maturation scores of bone growth sites displayed in an X-ray image, RUS (radius, ulna, short bones) scores and carpal scores are obtained. In general, bone growth sites maturation grades are classified into A-I, that is, nine grades, and a maturation score corresponding to each bone maturation grade is provided.

In general, a clinical doctor determines a bone maturation grade from an X-ray image of a hand, converts the bone maturation grade into a maturation score, calculates RUS scores or carpal scores by adding bone maturation scores, and measures a bone age of a child, on the basis of the TW3 method.

Since the existing bone age measurement methods are performed by a subjective determination of the clinical doctor, errors may occur between clinical doctors, and even one doctor may provide different results in different time.

Therefore, an apparatus for computing a bone maturation grade objectively through a computer algorithm is required, and bone maturation grade computing apparatuses using several computer algorithms have been developed and applied.

However, most of the apparatuses associated with bone age measurement that have been clinically applied serve as tools for helping doctors to perform the TW3 bone age measurement easily using the acquired X-ray image and cannot compute the bone maturation grade by themselves. In addition, although a function of computing the bone maturation grade is included, doctors have to involve in the determination. In addition, although operations for computing bone maturation grades are automated, in some cases, accuracy of the result of the computation may not be guaranteed.

More specifically, the determination of a bone maturation grade is performed by classifying and assessing changes in shapes of an epiphysis and a metaphysis that form a bone growth site and the amount of fusion between the two bones. Therefore, for more accurate determination of the bone maturation grades, edges between the epiphysis and the metaphysis forming the bone growth site have to be accurately extracted.

However, in the existing method, extraction of the edge between the epiphysis and the metaphysis from the X-ray image is performed by applying various edge detection masks and a method of setting a gray level threshold. However, when the aforementioned method using the X-ray image is used to detect the edge, signal noises are mixed, so that there is a problem in that reliability of a result of the detection is decreased.

In addition, in order to reduce the effects of the signal noises from the X-ray image, some methods such as an Active Shape Model (ASM) or Snake are used to detect a bone edge line. In this case, a number of sample images have to be acquired in advance to manually segment bone edges by clinical doctors. In addition, according to methods of providing a curvature characteristic to the Snake, the performances of bone edge detection are changed. In addition, there is a problem in that a snake appropriate for various bone edges cannot be easily generated.

As described above, conventional methods of extracting an edge of the distal radius metaphysis which is an important factor to measure a bone age from an X-ray image have a problem in that accuracy of the result of the extraction is decreased and reliability of the bone age measurement is decreased.

SUMMARY OF THE INVENTION

Therefore, an aspect of the present invention provides a method and an apparatus for extracting an edge of the distal radius metaphysis that has a high reliability from an X-ray image having signal noises by using a gradient of gray levels and a metropolis annealing technique to accurately and simply extract the edge of the metaphysis from the X-ray image of a distal radius.

According to an aspect of the present invention, there is provided a method of extracting an edge of a distal radius metaphysis including: setting a region of interest including a distal radius in an X-ray image; setting a potential energy distribution of the region of interest by using a gradient of gray levels; setting a temporary edge adjacent to both sides of a distal radius metaphysis and a side of an epiphysis in the region of interest; and extracting a detailed edge of the distal radius metaphysis having minimum energy by adjusting the set temporary edge using a metropolis annealing technique.

According to another aspect of the present invention, there is provided an apparatus for extracting an edge of a distal radius metaphysis including: a region of interest setting unit setting a region of interest including a distal radius metaphysis in an X-ray image; a potential energy setting unit setting a potential energy distribution by using a gradient of gray levels in the region of interest; a pre-processing unit setting a temporary edge of the distal radius metaphysis in the region of interest; and an edge extracting unit extracting a detailed edge of the distal radius metaphysis by adjusting the set temporary edge by using a metropolis annealing technique.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
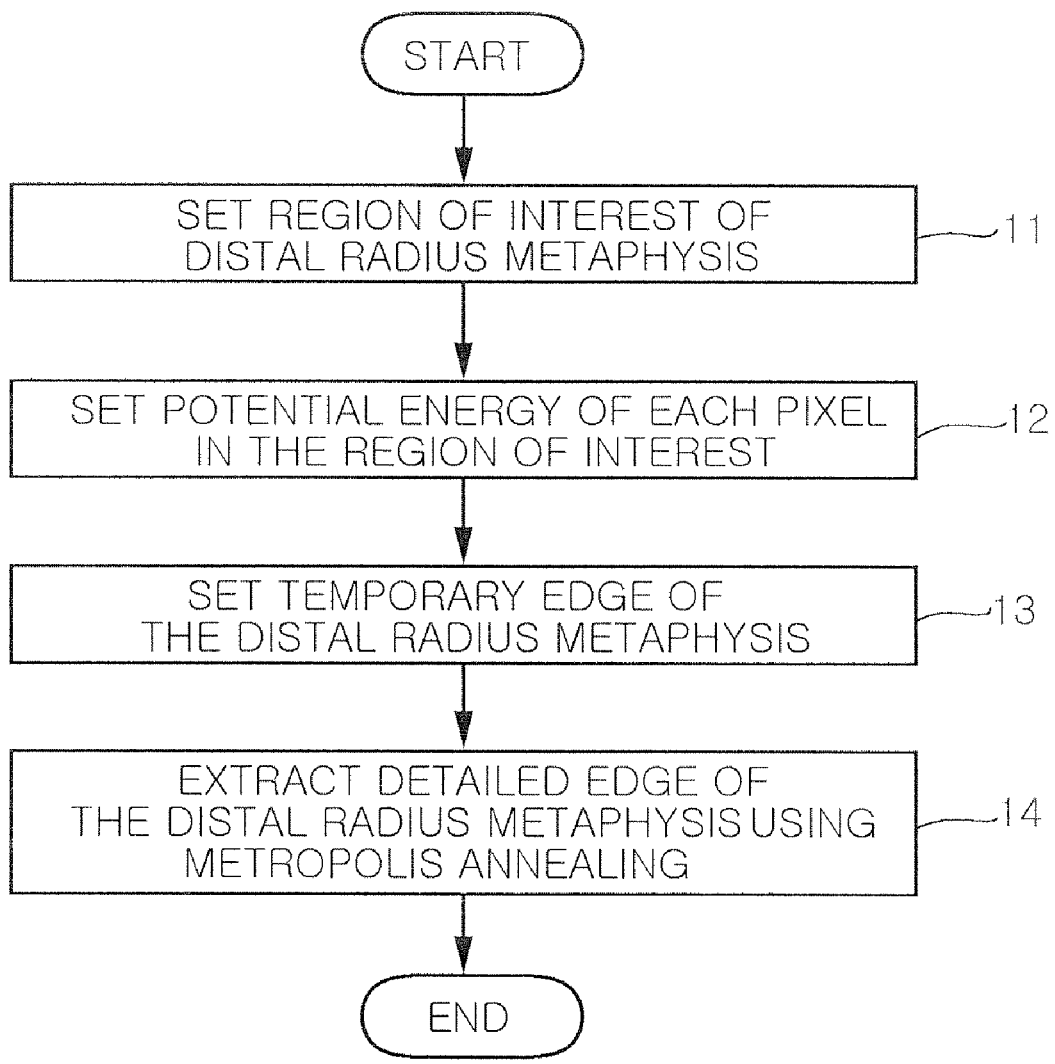
FIG. 1 is a flowchart of a method of extracting an edge of a distal radius metaphysis according to an embodiment of the present invention.

Exemplary embodiments of the present invention will now be described in detail with reference to the accompanying drawings. In the description, the detailed descriptions of well-known functions and structures may be omitted so as not to hinder the understanding of the present invention.

Like reference numerals designate like elements throughout the specification.

In addition, in the specification, it should be noted that when a portion "is connected to" the other portion, the portion can be directly connected thereto or indirectly connected thereto with intervening elements present. In addition, it should be noted that a phrase that a portion "includes" an element means that the other element is not excluded but it can be further included therein if a particularly contrary phase is not disclosed.

FIG. 1 is a flowchart of a method of extracting an edge of a distal radius metaphysis according to an embodiment of the present invention.

Referring to FIG. 1, the method of extracting an edge of the distal radius metaphysis according to the present invention includes a step 11 of receiving an X-ray image and setting a region of interest including the distal radius metaphysis in the X-ray image. The X-ray image may be acquired by using conventional analog film X-ray systems or digital sensor X-ray systems. The method of extracting an edge of the distal radius metaphysis according to the present invention uses brightness differences between a distal radius and adjacent soft tissues shown in the X-ray image. Radiography using the X-ray system may be performed so that contrast between the distal radius and the adjacent soft tissue is high.

Figure 2:
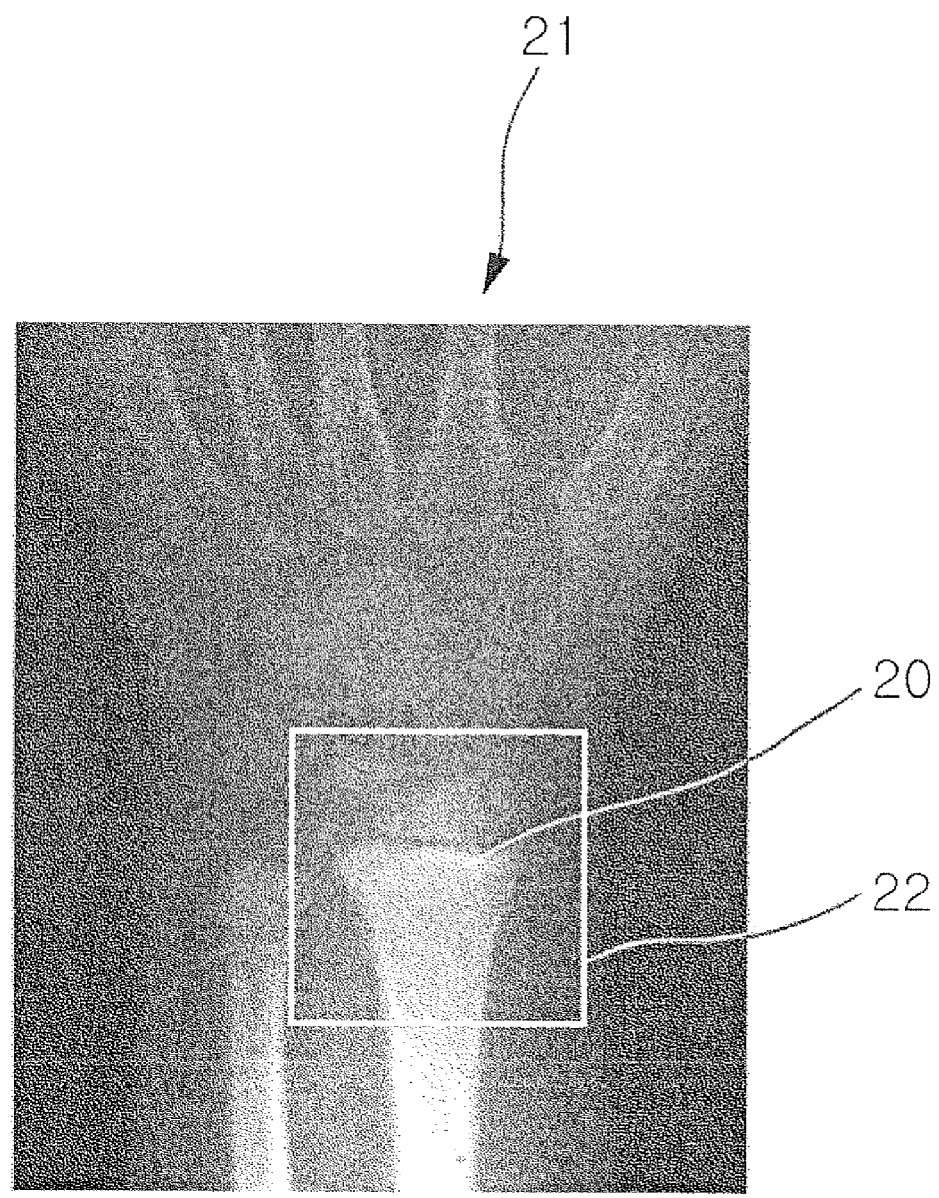
FIG. 2 illustrates an example of an X-ray image and a set region of interest used to extract an edge of the distal radius metaphysis according to the present invention.

FIG. 2 illustrates an example of the X-ray image 21 and the set region of interest 22 illustrating the distal radius and adjacent portions. As illustrated in FIG. 2, the X-ray radiography is performed to show that a distal radius 20 is parallel to an axis of the image, and the center portion of the region of interest 22 is disposed at the center portion of the distal radius metaphysis 20. In the example illustrated in FIG. 2, a spatial resolution of the X-ray image 21 is set to 200 pixels per inch (PPI), and 256 (8-bit) gray levels are used. The region of interest includes 236×236 pixels.

Returning to FIG. 1, the method of extracting an edge of the distal radius metaphysis according to the present invention includes a step 12 of setting a potential energy of each pixel by using a gradient of the gray levels for the set region of interest and obtaining a potential energy distribution of the region of interest.

Here, the calculation of the gradient may use a 3×3 Sobel filter (referred to as S). In addition, in order to further reduce signal noise, a Sobel filter that has an enlarged size may be used. When the Sobel filter (S) is used, a gradient of each pixel is set to $\sqrt{Sx^2+Sy^2}$ that is a combination of an x-directional Sobel filter value (referred to as Sx) with a y-directional Sobel filter value (referred to as Sy), and a potential energy of the pixel is set to $-\sqrt{Sx^2+Sy^2}$. Accordingly, a dynamical system in which a potential energy of a pixel is decreased as a gradient of the pixel (that is, at an edge between a distal radius and a soft tissue) is increased can be implemented.

Figure 3:
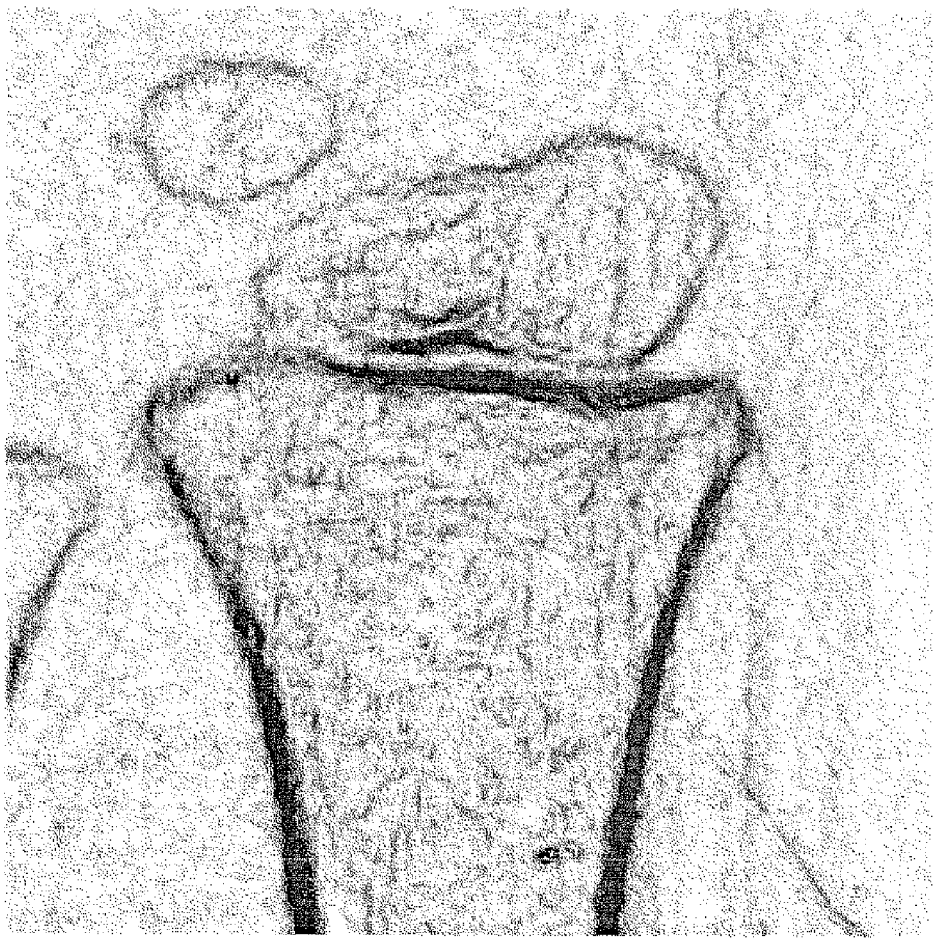
FIG. 3 illustrates an image in which a potential energy distribution is set according to the present invention.

FIG. 3 illustrates an image showing potential energies of the region of interest 22 set in the step 12. As described above, the image is set to have a lower potential energy at a pixel with higher gradient. Therefore, as brightness of a pixel in the image decreases, a potential energy of the pixel decreases.

Returning to FIG. 1, the method of extracting an edge of the distal radius metaphysis according to the present invention includes a step of 13 of setting a temporary edge at both sides of the distal radius metaphysis and at a side of an epiphysis by using the potential energy image of the region of interest.

Figure 4:
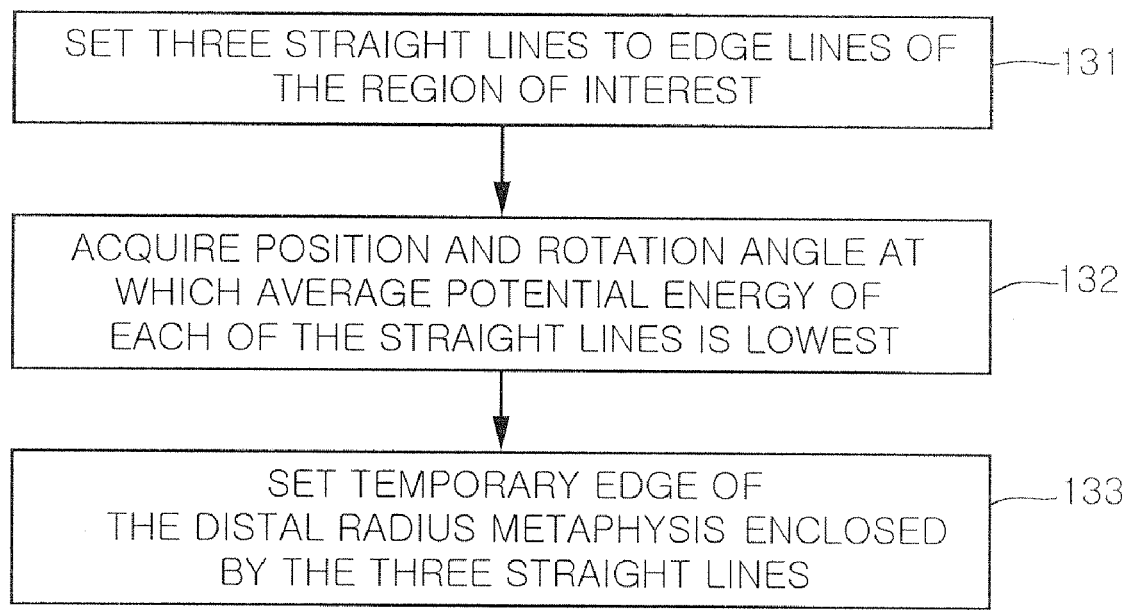
FIG. 4 is a detailed flowchart of an operation of setting a temporary edge in a method of extracting an edge of the distal radius metaphysis according to an embodiment of the present invention.

FIG. 4 is a detailed flowchart of the operation of setting the temporary edge in the step 13 according to an embodiment of the present invention.

Referring to FIG. 4, a pre-processing operation in the step 13 includes a step 131 of setting two straight lines at both side edges of the region of interest parallel to the Y-axis and setting another straight line at the top edge of the region of interest parallel to the X-axis, and a step 132 of finding a position and a rotation angle at which an average potential energy of pixels on the straight lines has a minimum value by moving centers of the three straight lines toward the center of the region of interest and simultaneously rotating the three straight lines. Specifically, since the minimum potential energy is obtained at an edge between a background and the distal radius, the three straight lines are disposed to be closest to corresponding edges of the distal radius, and thus the corresponding average potential energies can have minimum values there. Therefore, in a step 133, an edge enclosed by the three straight lines having positions and rotation angles at which the average potential energies have the minimum values is set to the temporary edge of the distal radius metaphysis.

Figure 5:
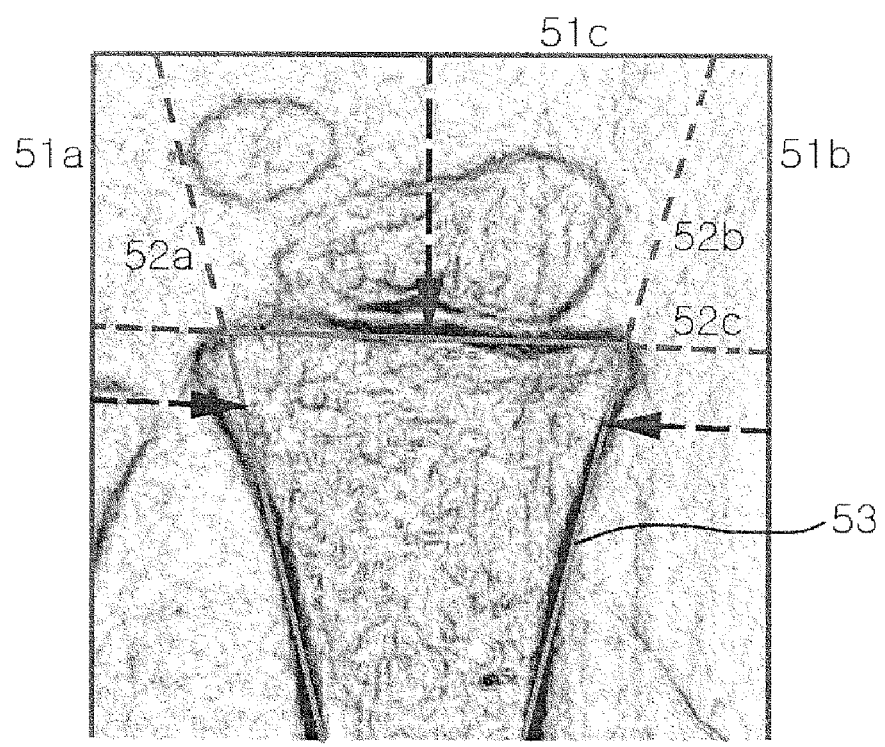
FIG. 5 illustrates an example of setting a temporary edge of the distal radius metaphysis according to the present invention.

FIG. 5 illustrates the pre-processing operation in the step 13 according to the embodiment of the present invention. Numerals 51a, 51b, and 51c denote the three straight lines disposed at corresponding initial positions in the step 131, and numerals 52a, 52b, and 52c denote the three straight lines which are moved, rotated, and disposed at the positions having the minimum average potential energies. In addition, a numeral 53 denotes the temporary edge formed by the three straight lines 52a, 52b, and 52c.

Returning to FIG. 1, the method of extracting an edge of the distal radius metaphysis according to the present invention includes a step 14 of extracting a detailed edge of the distal radius metaphysis by processing the set temporary edge using a metropolis annealing technique.

Figure 6:
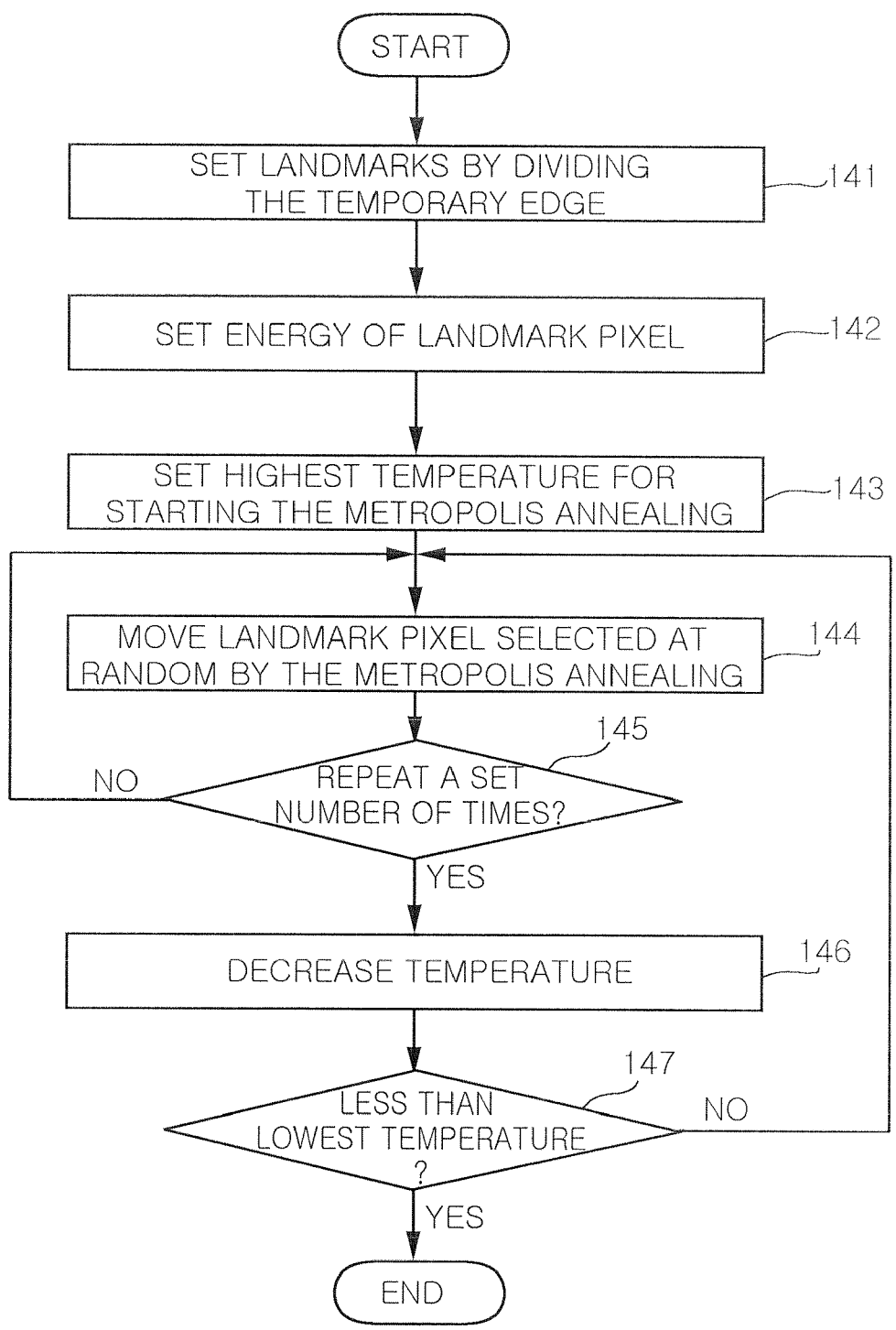
FIG. 6 is a flowchart of a detailed operation of setting a detailed edge of the distal radius metaphysis in the method of extracting an edge of the distal radius metaphysis according to the embodiment of the present invention.

FIG. 6 is a flowchart of a detailed operation of extracting an edge of the distal radius metaphysis using the metropolis annealing technique according to the embodiment of the present invention.

Figure 7:
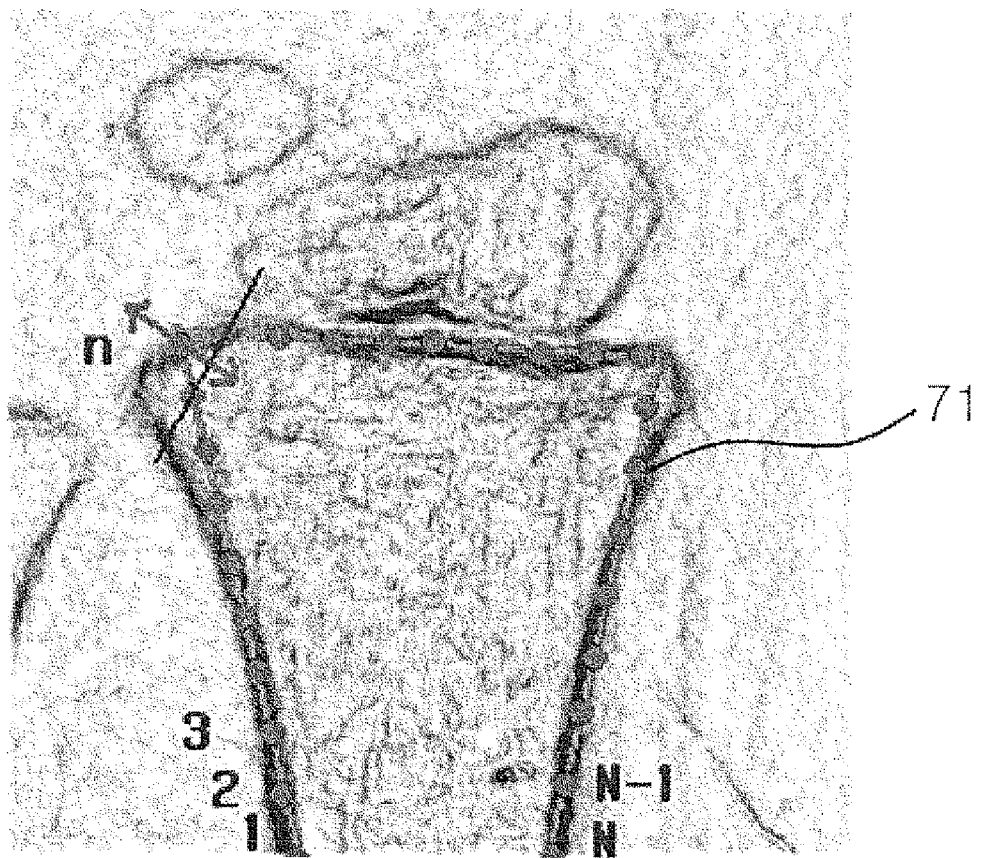
FIG. 7 illustrates an example of setting a number N of the landmark pixels in the operation of setting the detailed edge of the distal radius metaphysis according to the present invention.

Referring to FIG. 6, in order to extract the detailed edge of the distal radius metaphysis, in a step 141, a number of landmark pixels are set in the region of interest by dividing the set temporary edge. FIG. 7 illustrates an example of setting N landmark pixels. The temporary edge set in the image is divided by predetermined intervals to set a corresponding pixel at the temporary edge as a landmark pixel 71. For the convenience, two landmarks (referred to as first and N-th landmarks) disposed at both ends of the temporary edge are restricted so as to be moved along an edge line of the region of interest.

In addition, in a step 142, an energy E of each of the landmark pixels is set. Here, various methods can be used to set energy of a landmark pixel. For example, the energy is set as a sum of a potential energy and a bending energy of the corresponding landmark pixel. The bending energy of the n-th landmark pixel may be set as $-E_B \cos(\theta)$ by using an angle $\theta$ formed by (n−1)-th, n-th, and (n+1)-th landmark pixels. The bending energy is a kind of penalty for preventing a bend without a potential energy decrease. A coefficient $E_B$ of the bending energy of the n-th landmark pixel may be a constant or set to be proportional to an average potential energy of the (n−1)-th, n-th, and (n+1)-th landmark pixels. In the embodiment illustrated in FIG. 7, the latter is used. Thereafter, in a step 143, a highest temperature $T_H$ for starting the metropolis annealing is set. The highest temperature $T_H$ may have a value larger than the absolute value of the lowest potential energy and according to the current embodiment, may be set to a value five times the absolute value of the minimum potential energy for the convenience.

The metropolis annealing is a technique for finding a structure at a low energy state of a corresponding physical system by simulating the most probable physical state at a given temperature while decreasing the temperature of the physical system. The technique prevents that the corresponding physical system falls into its local minimum and cannot be reached a practically minimum state, and generates the most probable physical state at any temperature. In order to change a state of a physical system at a temperature of T, in the metropolis annealing technique, when the energy variation is ΔE, a state change is set at a possibility of maximum of $$\exp\left(-\frac{\Delta E}{T}\right)$$

and 1 to generate the most probable physical state.

Therefore, when the highest temperature $T_H$ is set as described above, in a step 144, in a state where a metropolis annealing temperature T is set to the temperature $T_H$, a position of a landmark pixel selected at random or sequentially is moved to an adjacent position. In this case, the movement is accepted by calculating the energy variation of the system in the metropolis annealing technique. In addition, in a step 145, operations in the step 144 are repeated a predetermined number (a number of times the number N of the total landmark pixels) of times. After the movement is performed the predetermined number of times, in a step 146, the temperature T is decreased by a unit temperature ΔT set in advance, and in a step 147, a current metropolis annealing temperature T is checked. Thereafter, while decreasing the temperature T down to a predetermined minimum temperature $T_L$, the step 144 is repeated.

In the step 144, when the position of the landmark is moved to an adjacent position, the position is moved in a direction (an arrow direction in FIG. 7) perpendicular to a straight line connecting two, that is, before and behind landmarks, and as the position, a pixel within a distance set in advance from the current landmark position is set at random.

By repeating the step 144, each of the set landmark pixels is moved to a pixel having a minimum energy, so that the most probable edge of the distal radius metaphysis can be extracted.

Figure 8:
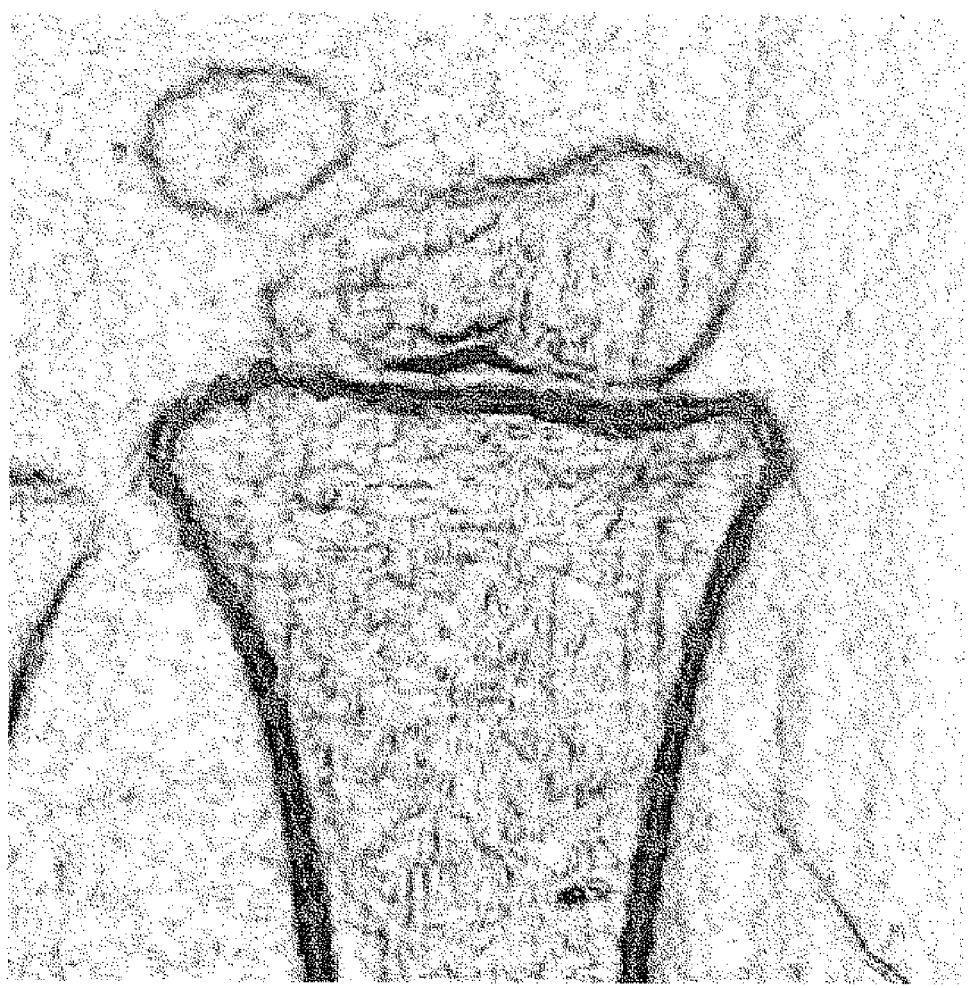
FIG. 8 illustrates an example of a result of extracting the detailed edge of the distal radius metaphysis according to the present invention.

FIG. 8 illustrates an example of a result of extracting the detailed edge of the distal radius metaphysis by adjusting the temporary edge set in the step 13 in the aforementioned metropolis annealing technique.

As described above, when the edge of the distal radius metaphysis is extracted by using a conventional active shape model (ASM), a large number of databases for extraction of an edge of a distal radius metaphysis are needed. In addition, when the distal radius metaphysis is extracted by using the snake or the like, the performance of the metaphysis edge detection may be changed according to characteristics of the stake. However, in the method of extracting the edge of the distal radius metaphysis according to the present invention, without additional databases, the most physically natural edge can be obtained from the X-ray image, and a simple and good metaphysis edge extraction performance can be obtained.

Figure 9:
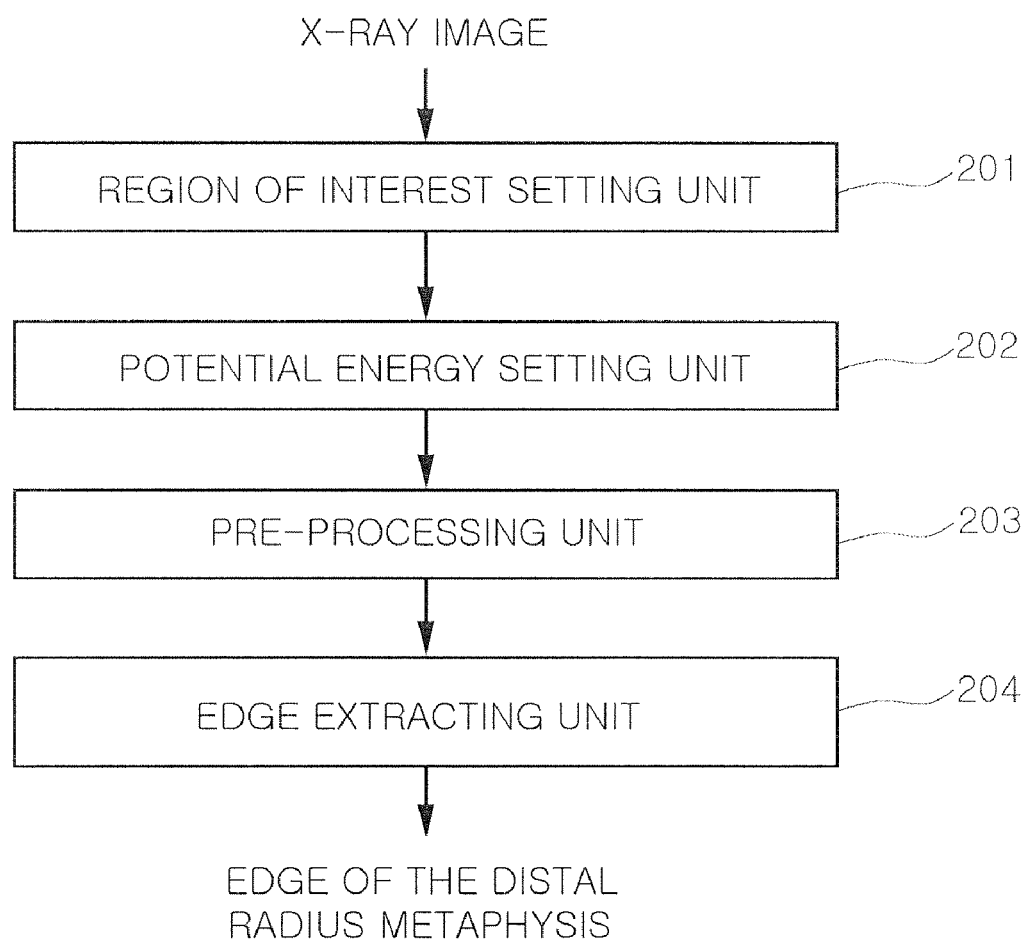
FIG. 9 is a block diagram illustrating an apparatus for extracting an edge of the distal radius metaphysis according to an embodiment of the present invention.

FIG. 9 is a block diagram illustrating an apparatus for extracting an edge of a distal radius metaphysis according to an embodiment of the present invention.

Referring to FIG. 9, the apparatus for extracting an edge of a distal radius metaphysis according to the present invention includes a region of interest setting unit 201 for setting a region of interest including a distal radius metaphysis in an X-ray image of a hand, a potential energy setting unit 202 for generating a potential energy distribution image by setting a potential energy of each pixel in the region of interest by using a gradient of gray levels, a pre-processing unit 203 for setting a temporary edge of the distal radius metaphysis by using the potential energy distribution image of the region of interest, and an edge extracting unit 204 for extracting a detailed edge of the distal radius metaphysis formed by adjusting the temporary edge of the potential energy distribution image using the metropolis annealing method so that the detailed edge has portions having lowest energies.

Operations of the aforementioned apparatus for extracting the edge of the distal radius metaphysis are performed according to the method of extracting an edge of a distal radius metaphysis, so that a detailed description of the operations is omitted to avoid redundancy.

Accordingly, when an edge of a distal radius metaphysis is to be extracted by using an X-ray image of a hand, the edge of the distal radius metaphysis can be simply and accurately extracted by using the gradient of the gray levels and the metropolis annealing technique.

The apparatus for extracting an edge of a distal radius metaphysis according to the present invention can also be embodied as computer readable codes on a computer readable recording medium. Specifically, the apparatus for extracting an edge of a distal radius metaphysis according to the present invention can be embodied as computer programs to relatively simply and accurately extract the edge of the distal radius metaphysis needed to measure a bone age from an X-ray image of a hand. The computer readable recording medium includes any data storage device that can store data which can be thereafter read by a computer system. Examples of the computer readable recording medium include read-only memory (ROM), random-access memory (RAM), CD-ROMS, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been shown and described in connection with the exemplary embodiments, it will be apparent to those skilled in the art that modifications and variations can be made without departing from the spirit and scope of the invention as defined by the appended claims.

What is claimed is:

1. An apparatus for extracting an edge of a distal radius metaphysis comprising:
   a computing device having a processor, a memory, and an executable application residing in the memory for extracting an edge of a distal radius metaphysis comprising:
   a region of interest setting unit setting a region of interest including a distal radius in an X-ray image;
   a potential energy setting unit setting a potential energy distribution by using a gradient of gray levels in the region of interest;
   a pre-processing unit setting a temporary edge of a distal radius metaphysis in the region of interest; and
   an edge extracting unit extracting a detailed edge of the distal radius metaphysis by adjusting the set temporary edge by using a metropolis annealing technique.

2. The apparatus of claim 1, wherein the potential energy setting unit obtains the potential energy distribution by setting a potential energy of each pixel in the region of interest to a value obtained by multiplying an absolute value of a gradient of gray levels by −1.

3. The apparatus of claim 1, wherein the pre-processing unit sets three straight lines to three edge lines of the region of interest, respectively, the three edge lines disposed at both sides of the distal radius metaphysis and a side of an epiphysis in the region of interest, obtains an average value of potential energy of pixels disposed at each of the three set straight lines which are moved toward the center of the region of interest and simultaneously rotated, and sets a portion enclosed by three straight lines each of which has its minimum potential energy average value as the temporary edge.

4. The apparatus of claim 1, wherein the edge extracting unit extracts the detailed edge of the distal radius metaphysis by setting a plurality of landmarks disposed at the temporary edge line by dividing the temporary edge, setting an energy of each of the landmark pixels, and moving the landmark pixels using a metropolis annealing technique with decreasing a temperature in a range of from a highest temperature to a lowest temperature set in advance by a unit temperature.

5. The apparatus of claim 4, wherein the edge extracting unit moves the selected landmark pixel in a direction perpendicular to a straight line connecting before and behind landmark pixels of the selected landmark pixel and selects a pixel within a distance set in advance from a current position at random.

6. The apparatus of claim 1, wherein the X-ray image is acquired so that brightness differences between the distal radius and adjacent soft tissues are large.

7. The apparatus of claim 4, wherein the highest temperature is set to a value larger than an absolute value of minimum potential energy.

8. The apparatus of claim 4, wherein setting an energy of each landmark pixel is that an energy E of each landmark pixel is set to a value obtained by adding a potential energy to a bending energy of a corresponding landmark pixel, and the bending energy is set as $-E_B \cos(\theta)$ wherein $E_B$ denotes a coefficient of the bending energy of the corresponding landmark pixel, and θ denotes an angle formed between before and behind landmark pixels of the corresponding landmark pixel.

9. The apparatus of claim 8, wherein the coefficient $E_B$ of the bending energy of the landmark pixel is a constant.

10. The apparatus of claim 8, wherein the coefficient $E_B$ of the bending energy of the landmark is proportional to an average of potential energies of before and behind landmark pixels.

* * * * *